US007352092B2

(12) United States Patent
Levine et al.

(10) Patent No.: US 7,352,092 B2
(45) Date of Patent: Apr. 1, 2008

(54) INTEGRATED MOTOR AND CONTROLLER ASSEMBLIES FOR HORIZONTAL AXIS WASHING MACHINES

(75) Inventors: Gregory M. Levine, St. Louis, MO (US); Daniel E. Hilton, St. Louis, MO (US); Michael W. Major, Morro, IL (US); Stephen J. Burton, Fenton, MO (US); Scott M. Schroer, St. Charles, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/208,688

(22) Filed: Aug. 22, 2005

(65) Prior Publication Data

US 2007/0040460 A1 Feb. 22, 2007

(51) Int. Cl.
  *H02K 11/00* (2006.01)
(52) U.S. Cl. ........................................... 310/71; 310/89
(58) Field of Classification Search .................. 310/89, 310/71
  See application file for complete search history.

(56) References Cited

U.S. PATENT DOCUMENTS

| | | | | |
|---|---|---|---|---|
| 2,896,045 A | * | 7/1959 | Brunicardi | 335/187 |
| 3,271,602 A | * | 9/1966 | Waters | 310/68 R |
| 3,782,669 A | * | 1/1974 | Lewis | 200/335 |
| 4,467,230 A | * | 8/1984 | Rovinsky | 310/83 |
| 4,840,222 A | * | 6/1989 | Lakin et al. | 165/47 |
| 4,914,331 A | * | 4/1990 | Lewis | 310/90 |
| 5,006,744 A | * | 4/1991 | Archer et al. | 310/89 |
| 5,506,377 A | * | 4/1996 | Hill et al. | 200/47 |
| 5,610,461 A | * | 3/1997 | Dohogne et al. | 310/89 |
| 5,675,205 A | * | 10/1997 | Jacob et al. | 310/239 |
| 5,877,572 A | * | 3/1999 | Michaels et al. | 310/179 |
| 5,939,807 A | * | 8/1999 | Patyk et al. | 310/89 |
| 5,940,269 A | * | 8/1999 | Ko et al. | 361/697 |
| 5,952,757 A | * | 9/1999 | Boyd, Jr. | 310/156.81 |
| 6,091,174 A | * | 7/2000 | Genster | 310/89 |
| 6,232,687 B1 | * | 5/2001 | Hollenbeck et al. | 310/88 |
| 6,293,655 B1 | * | 9/2001 | Imanaka et al. | 347/65 |
| 6,313,557 B1 | | 11/2001 | De Filippis et al. | |
| 6,324,745 B1 | * | 12/2001 | Poag et al. | 29/598 |
| 6,577,030 B2 | * | 6/2003 | Tominaga et al. | 310/68 B |
| 6,647,575 B2 | * | 11/2003 | Garstecki et al. | 8/159 |

(Continued)

FOREIGN PATENT DOCUMENTS

DE            1172095          6/1964

(Continued)

*Primary Examiner*—Thanh Lam
(74) *Attorney, Agent, or Firm*—Harness, Dickey & Pierce, P.L.C.

(57) ABSTRACT

A horizontal axis washing machine includes an integrated motor and controller assembly. The controller is mounted to the electric motor with the controller positioned under a tub of the washing machine. The tub provides drip protection for the controller during operation of the washing machine. Additional embodiments include a motor and controller assembly in which a heat producing component of the controller is thermally coupled to a heat sink. The heat sink is positioned on an endshield of the electric motor and/or external to a housing of the motor controller. A stator of the electric motor can include one or more magnet wires attached directly to a connector for the motor controller.

8 Claims, 4 Drawing Sheets

U.S. PATENT DOCUMENTS

| | | | |
|---|---|---|---|
| 6,750,578 B2* | 6/2004 | Buening et al. | 310/89 |
| 6,861,819 B2 | 3/2005 | Marioni | |
| 7,132,769 B2* | 11/2006 | Uchida et al. | 310/72 |
| 2001/0054849 A1* | 12/2001 | Rybak | 310/12 |
| 2002/0039532 A1 | 4/2002 | Saito et al. | |
| 2003/0006665 A1* | 1/2003 | Kim et al. | 310/231 |
| 2003/0067228 A1* | 4/2003 | Vanjani | 310/64 |
| 2003/0163924 A1* | 9/2003 | Hempe et al. | 30/388 |
| 2004/0232788 A1* | 11/2004 | Marioni | 310/90 |
| 2005/0029882 A1* | 2/2005 | Liu et al. | 310/91 |
| 2005/0057108 A1* | 3/2005 | Kim et al. | 310/67 R |
| 2005/0105277 A1* | 5/2005 | Frisch | 361/716 |
| 2005/0146235 A1* | 7/2005 | Kim et al. | 310/67 R |
| 2005/0189837 A1* | 9/2005 | Lee | 310/217 |
| 2005/0189838 A1* | 9/2005 | Lee | 310/217 |
| 2005/0194848 A1* | 9/2005 | Ahn | 310/68 B |
| 2005/0194859 A1* | 9/2005 | Lee | 310/216 |
| 2005/0194860 A1* | 9/2005 | Lee | 310/217 |
| 2005/0241346 A1* | 11/2005 | Choi | 68/140 |

FOREIGN PATENT DOCUMENTS

| | | |
|---|---|---|
| DE | 3602606 | 7/1987 |
| DE | 19723664 | 12/1997 |
| EP | 0722210 | 7/1996 |
| EP | 1548916 | 6/2005 |
| EP | 1696070 | 8/2006 |

* cited by examiner ical systems, business-related and/or environmental constraints. Moreover, it will

INTEGRATED MOTOR AND CONTROLLER ASSEMBLIES FOR HORIZONTAL AXIS WASHING MACHINES

FIELD OF THE INVENTION

The present invention relates primarily to horizontal axis washing machines, and electric motor and controller assemblies for horizontal axis washing machines.

BACKGROUND OF THE INVENTION

Many horizontal axis washing machines—also referred to as "front loaders" because laundry is loaded through a door on the front side of the machine—are commonly provided with a variable speed electric motor for driving rotation of a laundry tub. The electric motor is typically located adjacent the tub and mechanically coupled to the tub using a belt system. A controller for the electric motor is mounted away from the electric motor, often adjacent to a controller for the washing machine, and electrically coupled to the electric motor via a cable assembly.

As recognized by the present inventors, these known washing machines have several disadvantages. For example, locating the motor controller away from the motor requires use of the cable assembly, which typically includes interference retarding components to reduce television interference. Additionally, because the motor controllers commonly include heat sinks mounted within a controller housing—also referred to as a drip shield—the controller housing is unnecessarily large, resulting in increased materials cost, and restricts heat dissipation from the heat sink.

SUMMARY OF THE INVENTION

To solve these and other needs, the present inventors have succeeded at designing, among other things, an integrated motor and controller assembly for horizontal axis washing machines.

According to one aspect of the present invention, an electric motor and controller assembly for a horizontal axis washing machine includes an electric motor and a controller. The controller includes software for controlling operation of the electric motor in the horizontal axis washing machine, and is mounted to the electric motor.

According to another aspect of the present invention, a horizontal axis washing machine includes a tub, an electric motor, and a controller for the electric motor. The controller is mounted to the electric motor. At least a portion of the controller is positioned under the tub with the tub providing drip protection for the controller.

According to yet another aspect of the present invention, an electric motor and controller assembly includes a stator, a rotor situated for rotation relative to the stator, at least one endshield, and a heat sink. The heat sink is positioned on the endshield. The assembly also includes a controller, and the controller includes at least one component thermally coupled to the heat sink positioned on the endshield.

According to still another aspect of the present invention, an electric motor and controller assembly includes an electric motor, a controller for the motor, and a heat sink. The controller includes a housing and at least one component thermally coupled to the heat sink. The heat sink is positioned on the motor and external to the controller housing.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

Like reference symbols indicate like elements or features throughout the drawings.

DETAILED DESCRIPTION OF EXEMPLARY EMBODIMENTS

Illustrative embodiments of the present invention are described below. In the interest of clarity, not all features of an actual implementation are described in this specification. It will be appreciated that in the development of any actual embodiment, numerous implementation-specific decisions must be made to achieve specific goals, such as performance objectives and compliance with system-related, business-related and/or environmental constraints. Moreover, it will be appreciated that such development efforts may be complex and time-consuming, but would nevertheless be a routine undertaking for those of ordinary skill in the art having the benefit of this disclosure.

Figure 1:
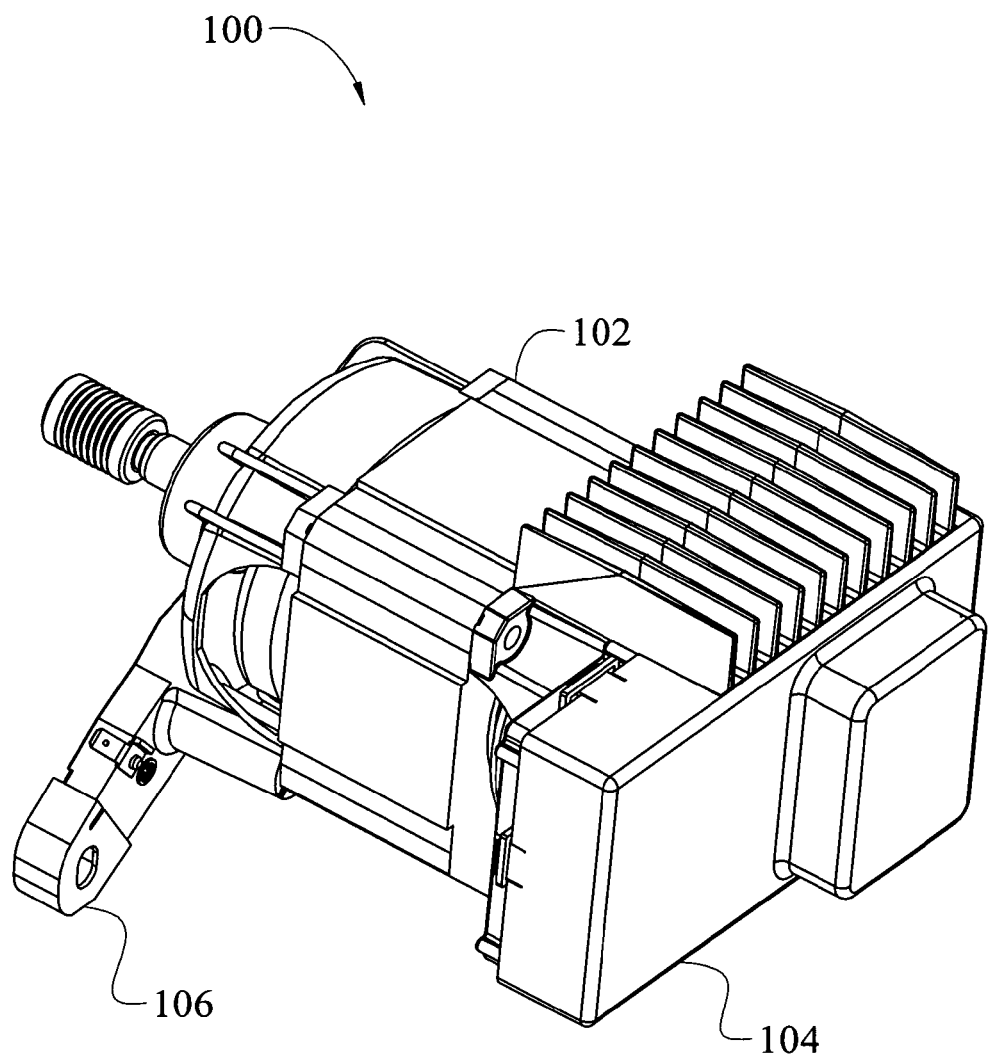
FIG. 1 is a perspective view of an electric motor and controller assembly according to one exemplary embodiment of the present invention.
Figure 3:
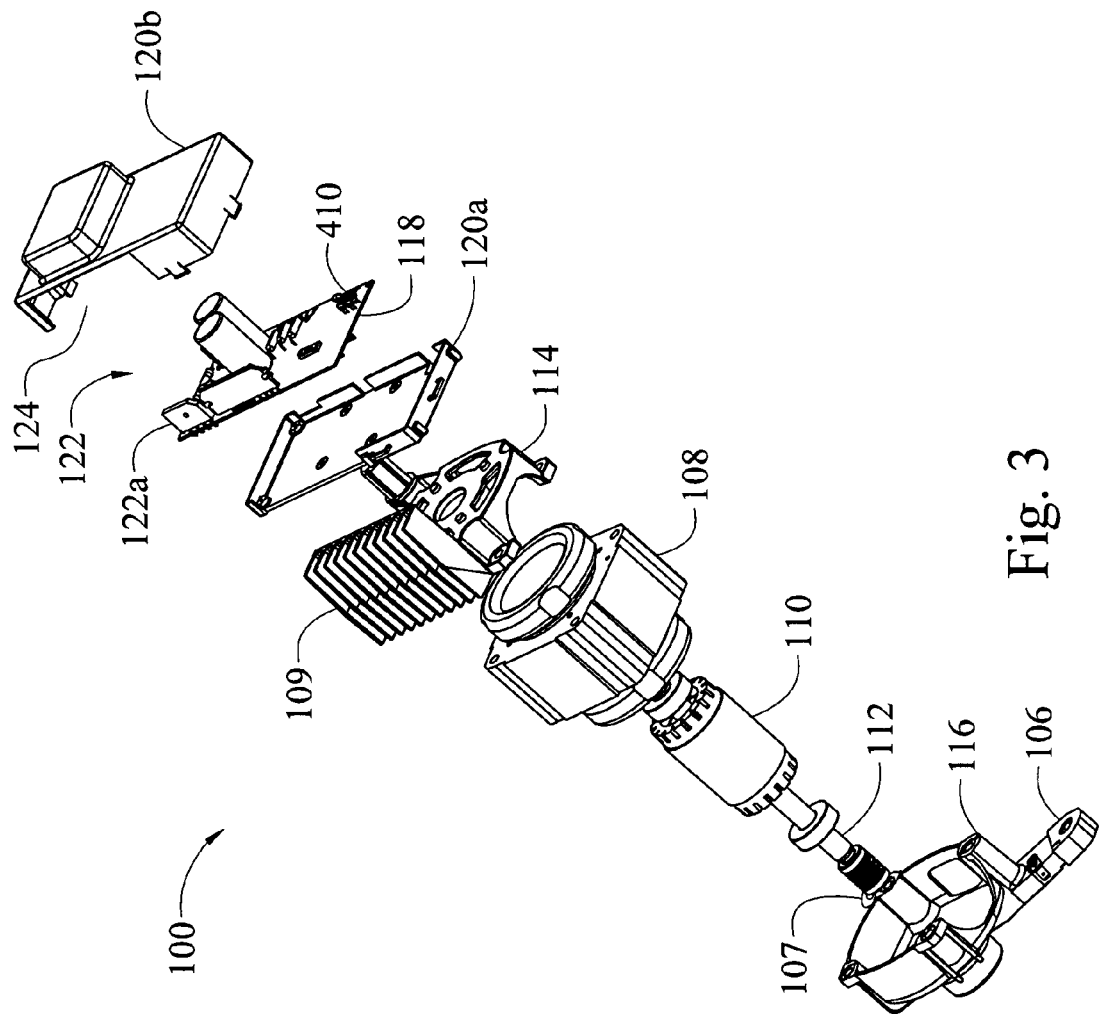
FIG. 3 is an exploded perspective view of the electric motor and controller assembly of FIG. 1.

An exemplary motor and controller assembly for a horizontal axis washing machine according to one embodiment of the present invention is illustrated in FIG. 1 and indicated generally by reference number 100. As shown in FIG. 1, the assembly 100 includes an electric motor 102 and a controller 104. The controller 104 includes, among other things, software for controlling operation of the electric motor 102 in a horizontal axis washing machine, typically in response to commands from a controller for the washing machine. Additionally, the electric motor 102 includes at least one attachment point 106 for mounting the electric motor 102 in a horizontal axis washing machine. An additional attachment point 107 is shown in FIG. 3, described below.

In the embodiment of FIG. 1, the electric motor 102 is a variable speed controlled induction motor. It should be understood, however, that other motor types, including brushless permanent magnet (BPM) and switched reluctance (SR) motors, can be employed without departing from the scope of the present invention. Furthermore, while the embodiment of FIG. 1 contemplates distinct machine and motor controllers, the machine controller can be integrated into the motor controller mounted to the electric motor without departing from the scope of the present invention.

In contrast to known washing machines having a motor controller positioned remotely from an electric motor, the controller 104 of FIG. 1 is mounted to the electric motor 102. As a result, various components employed in known designs are preferably eliminated in many embodiments of the invention, including wiring harnesses commonly provided between motors and controllers, EMI retarding components commonly included in the wiring harnesses, connectors, etc. Mounting the controller on the motor contributes to a more compact design, simplifies manufacturing, and reduces production costs for the assembly 100 and any horizontal axis washing machine that incorporates the assembly 100.

Figure 2:
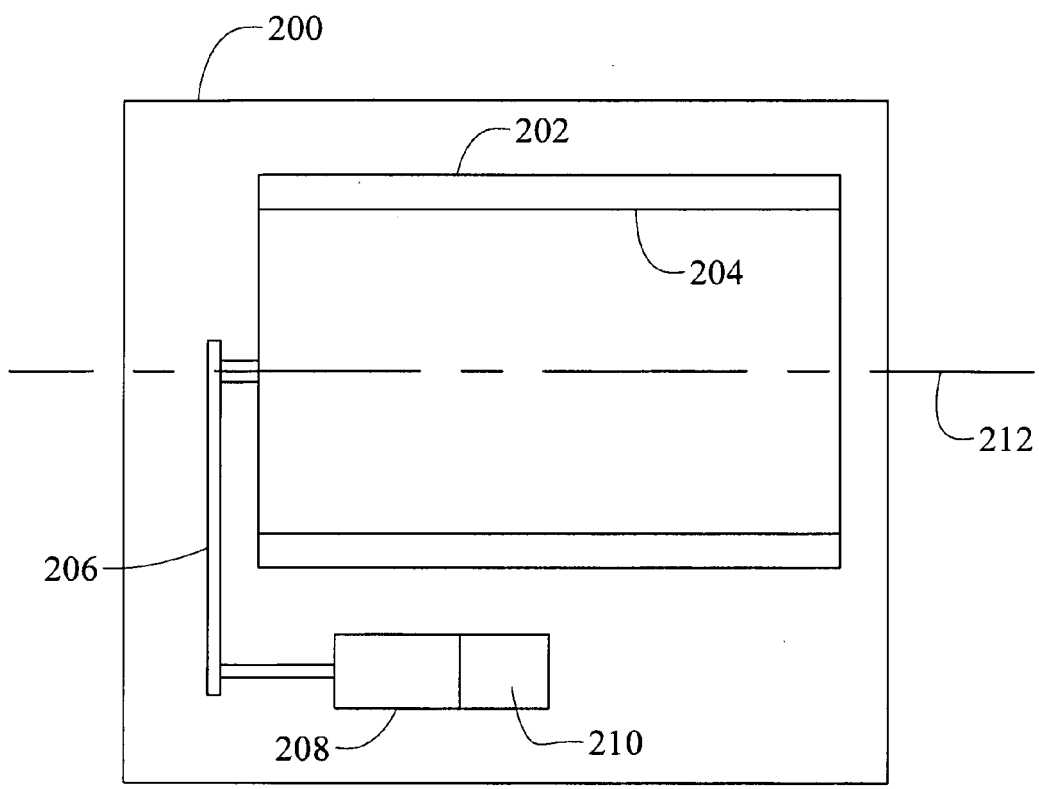
FIG. 2 is a block diagram of a horizontal axis washing machine according to another exemplary embodiment of the present invention.

FIG. 2 illustrates a horizontal axis washing machine 200 according to another embodiment of the present invention. As shown in FIG. 2, the washing machine 200 includes an outer tub 202, an inner tub 204, an electric motor 208 and a controller 210 for the electric motor 208. The controller 210 is mounted to the electric motor 208. Further, at least a portion of the controller 210 is positioned under the outer tub 202. As a result, the outer tub 202 provides drip protection for the controller including, for example, when the inner tub 204 overflows with water. Further, in cases where the controller includes a housing (also referred to as a drip shield) for providing drip protection, the dimensions of the housing can be reduced, resulting in material savings, due to the drip protection provided by the tub 204.

Additionally, positioning the motor 208 and the controller 210 under the outer tub 202 can help move air across any heat sink positioned on the motor 208 or the controller 210, particularly where the outer tub 202 is suspended within the washing machine 200 for limited movement or vibration of the outer tub 202 during operation of the machine 200.

As shown in FIG. 2, the motor 208 is coupled to the inner tub 204 via a belt 206 for driving rotation of the inner tub 204. FIG. 2 also illustrates the generally horizontal center axis 212 of the inner tub 204.

One example of a suitable motor and controller assembly for use in the horizontal axis washing machine 200 of FIG. 2 is the motor and controller assembly 100 shown in FIG. 1. The assembly 100 will now be further described with reference to the exploded view of FIG. 3.

As shown in FIG. 3, the electric motor 102 of FIG. 1 includes a stator 108, a rotor 110 situated for rotation relative to the stator, a shaft 112 and endshields 114, 116. In this particular embodiment, the rotor 110 is designed to rotate within an inner bore of the stator 108. Alternatively, outer rotor designs can be employed without departing from the scope of the invention.

With further reference to FIG. 3, the controller 104 shown in FIG. 1 is mounted to the endshield 114 and includes a circuit board 118, a housing 120, and various circuit components 122 (including at least one heat producing component 122a) attached to the circuit board 118 and generally protected by the housing 120. In this particular embodiment, the housing 120 includes a base 120a that is attached to the endshield 114, and a cover 120b that can be removably attached to the base 120a.

Also shown in FIG. 3 is a heat sink 109 positioned on the endshield 114. Preferably, the heat sink is integrally attached to the endshield. In the embodiment of FIG. 3, the heat sink 109 and the endshield 114 have a monolithic (i.e., single unit) construction and are formed from cast grade aluminum. This results in material savings as compared to prior art designs employing separate endshields and heat sinks. Alternatively, the heat sink 109 and the endshield 114 can be formed separately, in which case the heat sink 109 can optionally be positioned at a different location on the assembly 100.

In the embodiment of FIG. 3, the heat sink 109 is provided for dissipating heat generated by the heat producing component 122a (and possibly other components 122). In one exemplary construction, the heat producing component 122a is thermally coupled to the heat sink 109 after the circuit board 118 is attached to the housing base 120a. The housing cover 120b is then attached to the housing base 120a to protect the circuit board 118 and its various components 122.

The heat producing component 122a can be thermally coupled to the heat sink in any suitable manner. For example, the component 122a can be physically attached to the heat sink using fasteners and/or adhesives. Additionally, thermal paper may be provided between the heat producing component 122a and the heat sink 109 to enhance the transfer of heat therebetween.

As shown in FIG. 3, the housing cover 120b includes an opening 124 through which the heat producing component 122a is thermally coupled to the enshield 109. Although only one opening 124 is shown in FIG. 3, additional openings in the cover 120b can be provided as necessary for any particular application of the invention.

It should be noted that, in the embodiment of FIG. 3, the heat sink 109 is positioned on the motor 102 external to the controller housing 120. This is in contrast to prior art designs having a heat sink positioned within a controller housing. By positioning the heat sink 109 external to the controller housing 120, the dimensions of the housing can be reduced, resulting in material savings. Additionally, positioning the heat sink 109 external to the controller housing 120 allows for greater air flow across the heat sink and, therefore, increases the heat dissipating ability of the heat sink 109. This is particularly the case when the heat sink is positioned below the tub of a horizontal axis washing machine, where movement or vibration of the tub during operation will produce air movement across the heat sink.

Although the heat sink 109 positioned on the motor 102 and external to the controller housing 120 has been described above in connection with the motor and controller assembly 100 for a horizontal axis washing machine, it should be understood that these heat sink features can be applied to other electric motor designs and applications without departing from the scope of the present invention.

Figure 4:
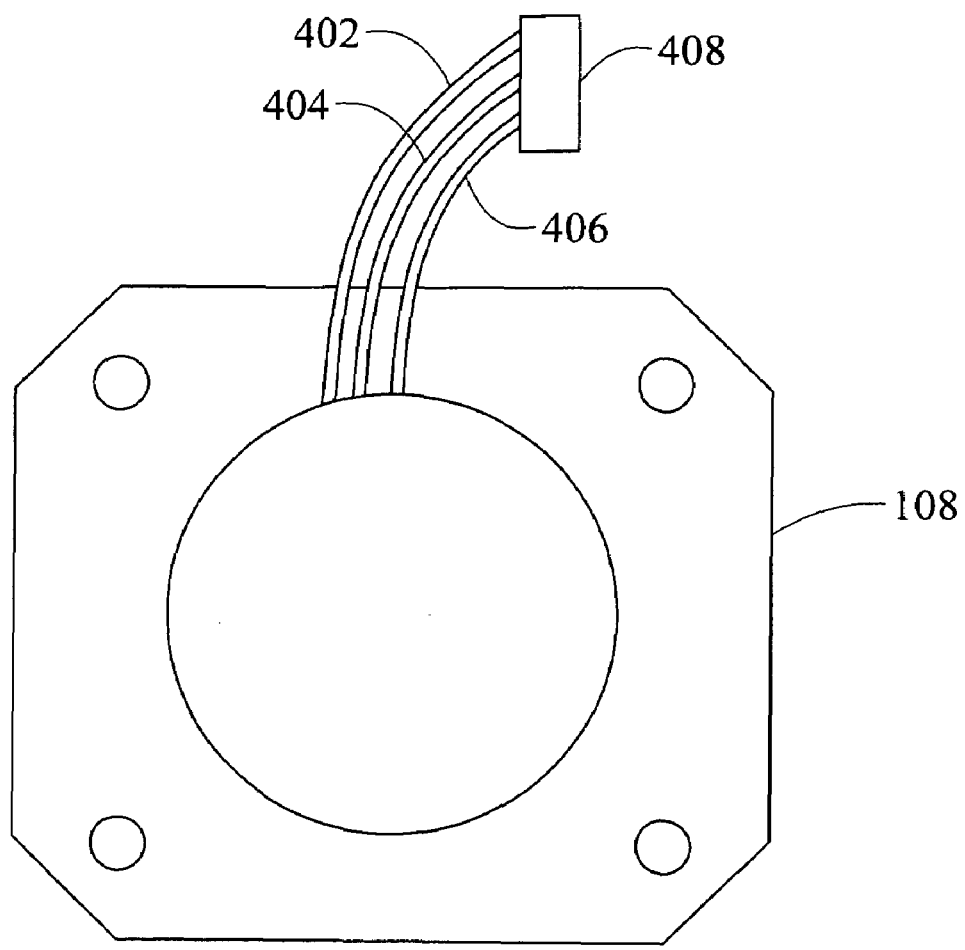
FIG. 4 is a top plan view of the stator of FIG. 3 illustrating a direct connection of magnet wires to a connector for the motor controller.

FIG. 4 illustrates additional features of the stator 108 shown in FIG. 3. As shown in FIG. 4, the stator 108 includes three magnet wires 402, 404, 406 (i.e., typically copper wire wound around portions of the stator to form magnetic coils) coupled directly to a connector 408. The connector 408 mates with a connector 410 on the controller circuit board 118, shown in FIG. 3. In this manner, the magnet wires 402, 404, 406 are connected to the controller 104 through a single set of connectors 408, 410. This is in contrast to prior art designs which splice magnet wires to lead wires, connect the lead wires to a plug on the motor, and connect the plug on the motor to a plug on the motor controller via a wiring harness. By connecting the magnet wires 402, 404, 406 to the controller 104 via a single set of connectors 408, 410, reliability of the motor and controller assembly 100 can be improved while simplifying its assembly and reducing costs. In the particular embodiment illustrated in FIGS. 3 and 4, the connectors 408, 410 are IDC connectors. Further, portions of the magnet wires 402-406 extending from the stator 108 to the connector 408 are preferably covered with insulative sleeving (not shown). While described in connection with the assembly 100 of FIGS. 1 and 3, it should be understood that the direct connection of the stator magnet wires to a controller can be employed in other motor applications without departing from the scope of the present invention.

Those skilled in the art will recognize that various changes can be made to the exemplary embodiments and implementations described above without departing from the scope of the present invention. Accordingly, all matter contained in the above description or shown in the accompanying drawings should be interpreted as illustrative and not in a limiting sense.

What is claimed is:

1. An electric motor and controller assembly for a horizontal axis washing machine, the assembly comprising an electric motor and a controller, the controller including software for controlling operation of the electric motor in the horizontal axis washing machine, the electric motor including a stator having an inner bore, a rotor situated for rotation within the inner bore of the stator, and at least one endshield having an external portion, the controller mounted to the external portion of the endshield.

2. The assembly of claim 1 wherein the endshield includes at least one attachment point for mounting the electric motor in the horizontal axis washing machine.

3. The assembly of claim 1 wherein the controller includes a housing and the housing is attached to the endshield.

4. The assembly of claim 1 wherein the endshield is mounted to the stator.

5. The assembly of claim 1 further comprising a heat sink positioned on the endshield.

6. The assembly of claim 5 wherein the heat sink and the endshield have a monolithic construction.

7. The assembly of claim 1 wherein the stator includes a plurality of magnet wires attached to a first connector, and the controller includes a second connector mating with the first connector.

8. The assembly of claim 7 wherein the controller includes a circuit board and the second connector is positioned on the circuit board.

* * * * *